June 3, 1924.  1,496,359
P. C. SEEL
PROCESS OF TREATING FILMS
Filed April 7, 1923
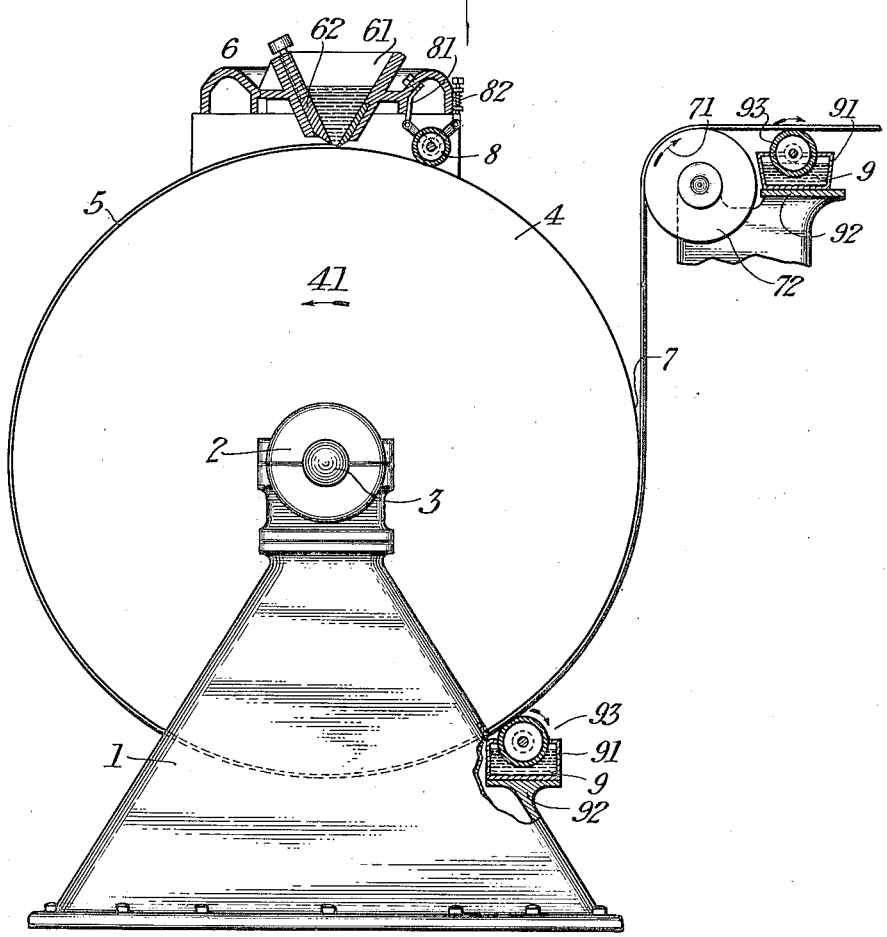
FIG_1_
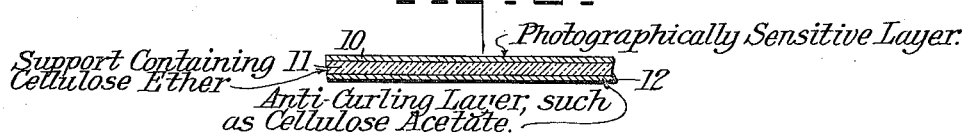
FIG_2_
INVENTOR.
Paul C. Seel,
BY R. L. Stinchfield
ATTORNEYS.

Patented June 3, 1924.

1,496,359

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

PROCESS OF TREATING FILMS.

Application filed April 7, 1923. Serial No. 630,654.

*To all whom it may concern:*

Be it known that I, PAUL C. SEEL, a citizen of the United States of America, residing at Rochester, in the county of Monroe and State of New York, have invented certain new and useful Improvements in Processes of Treating Films, of which the following is a full, clear, and exact specification.

This invention relates to processes of treating film, particularly film containing cellulose ethers. One object of this invention is to provide a simple inexpensive method of treating such film to lessen the tendency thereof to curl. Other objects will hereinafter appear.

In the accompanying drawing:

Fig. 1 is a diagrammatic side elevation, partly in section and on a reduced scale, of a film making apparatus in which my process may be carried out, certain parts being exaggerated in relative size for the sake of clearness;

Fig. 2 is a fragmentary diagrammatic sectional view on an exaggerated scale of film produced by my process.

It has been found that films containing cellulose ethers, such for instance as water-insoluble ethyl celluloses, sometimes have a tendency to curl. This tendency is exhibited somewhat in a plain film of cellulose ether composition, but it occurs to an undesirable extent in film which has been coated with a sensitive photographic emulsion. Moreover, it appears also after such sensitized film has been printed, fluid treated and dried in the usual manner. This curl may manifest itself in the case of a motion picture film strip by a tendency to curl laterally, the curl sometimes involving kinks and longitudinal buckling. Since this tendency, even when present in a small degree, detracts from the usefulness of the film, it is highly desirable that it be lessened or prevented, especially on the case of film manufactured on the usual apparatus.

I have discovered that this tendency to curl may be greatly lessened, or wholly eliminated in some instances, by applying a cellulose ester solution to a face of the film, so as to form a coating on such face. In the preferred embodiment of my invention the solution is preferably a thin one in a volatile solvent which has only a slight action on cellulose ether. The wetting of the face of the film with such solution and the subsequent evaporation form a strongly adherent thin coating of the cellulose ester on the cellulose ether layer.

By way of illustration, as one of the many different solutions that may be employed, I may use a 2% solution of cellulose acetate in acetone. This is preferably applied to the face of the film which is out of contact with the film-forming surface during the making of the main cellulose ether layer; or it may be applied to the back of the cellulose ether film after the latter has been coated with the photographically sensitive layer or emulsion. The acetone has a sufficient action on cellulose ether to cause a strong adhesion or weld between the cellulose acetate layer and the cellulose ether layer. It does not, however, attack the latter sufficiently to affect the body thereof.

Since my invention is useful in connection with film prepared on standard apparatus, I have illustrated my invention in connection therewith. In the drawing the base 1 supports a bearing 2 for the shaft 3 of a wheel or drum 4. The cylindrical peripheral facing 5 of the wheel moves, as indicated by the arrow 41, from the dope-applying station 6 to a stripping or film-removing station 7 and then back to station 6 past a cleaning station.

At the dope station there is a V-shaped trough 61 having the usual adjustable gate 62 for regulating the thickness of the layer, or composition, or dope that is deposited on facing 5. The film being drawn under tension away from the wheel 4, as indicated by arrow 71, passes over roller 72. The cleaning pad or roll 8 is conveniently carried on a swinging arm 81 that is depressed toward the wheel 4 by a spring pressed plunger 82. As these details are well known in the art, further explanation is unnecessary.

As the film containing cellulose ether, say water-insoluble ethyl cellulose, becomes set on the wheel 4, the condition which causes curling is created in the film. It is therefore, convenient to counteract the tendency shortly after it is created. I may, for example, locate on the base 1 a shelf 92 on which is a container 91 carrying the anti-curling dope 9 which is applied to the face of the film opposite the wheel by a roller 93. Of course, any suitable form of mechanism for applying the right amount of dope to the film may be employed. While wicks, sprays, absorbent belts and the like may be used, smooth metal rollers, power driven, are perfectly satisfactory, especially with a thin dope like a 2% (by weight) solution of cellulose acetate in acetone.

If the setting of the film on the wheel 4 does not bring it to the proper hardness for treatment while on the wheel, the anti-curling dope may be applied later, as indicated diagrammatically in the upper right hand part of Fig. 1, where the container 91 and applying roll 93 are located just beneath the normal path of the film. The anti-curling coating may likewise be performed in two steps, one at each of the stations shown in Fig. 1.

It is possible to apply the anti-curling coating after the cellulose ether support has already been provided with a photographically sensitive layer on one face. In that event the rear or uncoated face of the film is then wet with the dope, say by drawing it across an applying roller of the kind indicated in Fig. 1.

In Fig. 2, 11 indicates the support containing the cellulose ether; 10 denotes the photographically sensitive layer and 12 shows a thin adherent anti-curling layer of cellulose ester, such as cellulose acetate.

Having thus described my invention, what I claim as new and desire to secure by Letters Patent is:

1. The process of treating a film containing cellulose ether to lessen the curling tendency thereof, which comprises the step of applying an adherent coating of cellulose acetate to a face of such film.

2. The process of treating film containing cellulose ether and adapted to support a photographically sensitive coating on one face thereof, which comprises the steps of applying to the other face thereof sufficient solution of a cellulose ester in a volatile solvent to form a thin coating and then evaporating the applied solvent.

3. The process of lessening the tendency to curl in film formed by spreading a cellulose ether composition on a film-forming support and stripping the film therefrom, which comprises the steps of applying a dilute solution of cellulose acetate to the face of the film which remains out of contact with said support and evaporating the applied solvent.

4. The process of treating a film containing cellulose ether to lessen the curling tendency thereof, which comprises the steps of wetting a face of such film with a solution of a cellulose ester in a volatile solvent which has at least a slight solvent action on said cellulose ether and evaporating said solvent to leave a firmly adherent coating of said cellulose ester on said cellulose ether.

5. As an article of manufacture, a film resistant to curling comprising a cellulose ether layer having an adherent layer of cellulose acetate on one face thereof.

Signed at Rochester, New York this 29th day of March, 1923.

PAUL C. SEEL.